(12) United States Patent
Cleghorn et al.

(10) Patent No.: US 7,820,910 B1
(45) Date of Patent: Oct. 26, 2010

(54) ADAPTER FOR ELECTRICAL OUTLET COVER

(75) Inventors: Richard Cleghorn, Tempe, AZ (US); Jeffrey P. Baldwin, Phoenix, AZ (US)

(73) Assignee: TayMac Corporation, Gilbert, AZ (US)

( * ) Notice: Subject to any disclaimer, the term of this patent is extended or adjusted under 35 U.S.C. 154(b) by 434 days.

(21) Appl. No.: 12/035,336

(22) Filed: Feb. 21, 2008

Related U.S. Application Data

(60) Provisional application No. 60/890,967, filed on Feb. 21, 2007.

(51) Int. Cl.
*H02G 3/14* (2006.01)

(52) U.S. Cl. .................. 174/66; 174/67; 312/328; 439/136

(58) Field of Classification Search ............ 174/66, 174/67; 220/241, 242; 312/328; D8/353; D13/177; 439/136, 143–147
See application file for complete search history.

(56) References Cited

U.S. PATENT DOCUMENTS

| | | | |
|---|---|---|---|
| 6,133,531 A | 10/2000 | Hayduke et al. | |
| 6,476,321 B1 | 11/2002 | Shotey et al. | |
| 6,872,887 B2 | 3/2005 | Shotey et al. | |
| 6,979,777 B2 | 12/2005 | Marcou et al. | |
| 7,119,227 B2 | 10/2006 | Sakakura et al. | |
| 7,462,777 B2 * | 12/2008 | Dinh ........................... | 174/58 |
| 7,479,598 B1 * | 1/2009 | Shotey et al. ............... | 174/58 |
| 7,538,271 B2 * | 5/2009 | O'Young et al. ............ | 174/66 |
| 7,674,976 B2 * | 3/2010 | Eastin ......................... | 174/66 |

* cited by examiner

*Primary Examiner*—Dhiru R Patel
(74) *Attorney, Agent, or Firm*—Booth Udall, PLC

(57) ABSTRACT

An electrical device cover with a lid coupled to a base assembly including an adapter that couples to the base through sliding lateral to the opening in the base. Particular implementations of an adapter include adapters with "L-" or other-shaped engagement tabs and adapters including straight, flat or pin-shaped engagement tabs. In particular implementations using an engagement tab, the adapter may be moved toward the base either before or after sliding parallel to the base surface, and thus engages with the base. In other implementations, the adapter is simply slid parallel to the base surface to engage with the base.

20 Claims, 9 Drawing Sheets

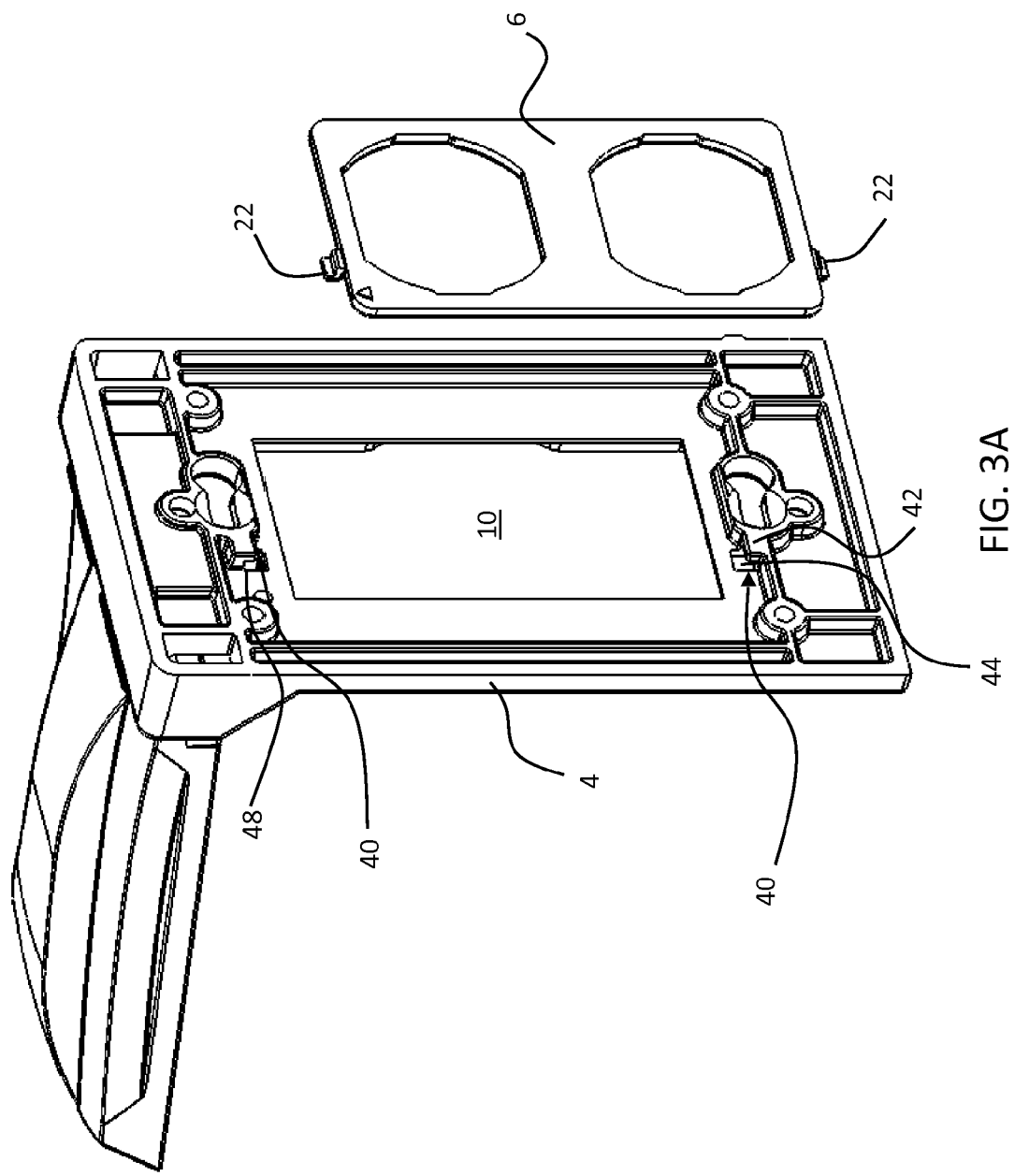

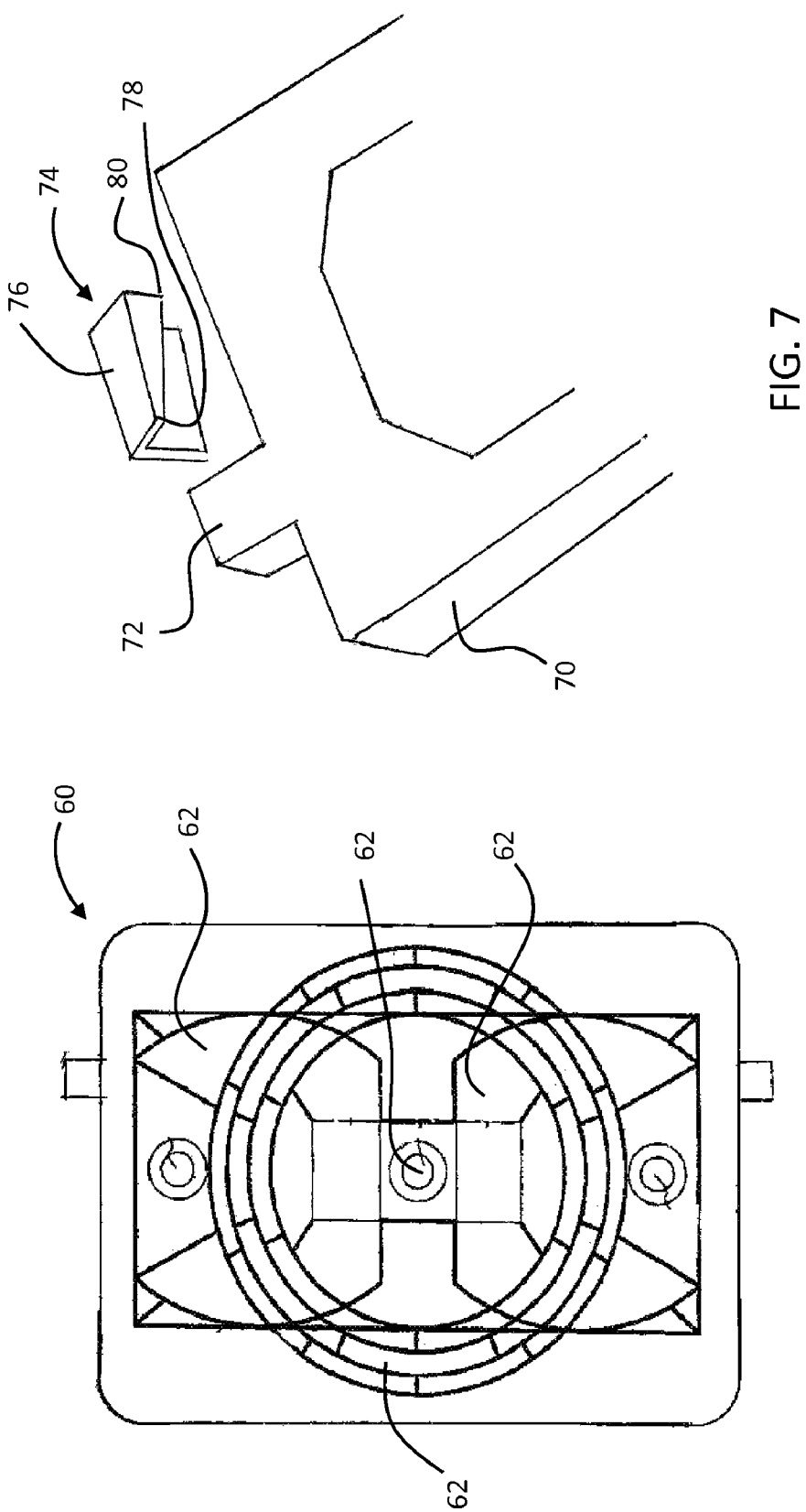

ADAPTER FOR ELECTRICAL OUTLET COVER

CROSS REFERENCE TO RELATED APPLICATIONS

This document claims the benefit of the filing date of U.S. Provisional Patent Application 60/890,967, entitled "Slide-in Adapter Plate" to Richard Cleghorn which was filed on Feb. 21, 2007, the disclosure of which is hereby incorporated entirely herein by reference.

BACKGROUND

1. Technical Field

Aspects of this document relate generally to covers for electrical outlets.

2. Background Art

Electrical device adapters are known in the art. An example of an adapter that permits conversion between multiple devices is found in "Universal Cover Plate," U.S. Pat. No. 6,872,887 to Shotey et al., and "Convertible Electrical Device Cover and Method for installing Same," U.S. Pat. No. 7,119,227 to Shotey et al., the disclosures of which are incorporated herein by reference in their entirety.

Conventionally, each type of outlet device has a different type of cover plate configured for it. To install a cover for the device, an electrician must have an appropriately configured cover for that device. This adds cost and inconvenience to the electricians' ability to provide services. Removable adapters are also known in the industry. Shotey et al., U.S. Pat. No. 7,119,227 discloses a removable adapter with removable sections allowing the adapter to be adapted to different types of electrical devices. Conventional adapters are made of plastic and, when they include engagement members, the engagement members deform slightly to allow the engagement members to form a tight friction fit when coupled to the base.

Electrical outlets, particularly those located outdoors, often need protection from water and other contaminants. To provide the needed protection, covers have been conventionally used, particularly when electrical outlets are mounted in outdoor or otherwise wet locations. A wide variety of cover designs have been devised. Some covers are configured as while-in-use covers (sometimes called "bubble covers" in particular configurations that include a bulged lid). Other covers are not configured as while-in-use covers, but are nevertheless weatherproof (sometimes called flat covers). U.S. Pat. No. 6,476,321 to Shotey et al. (issued Nov. 5, 2002), which disclosure is hereby incorporated herein by reference for its relevance to the manufacture and use of conventional covers, discloses both while-in-use cover examples and non-while-in-use cover examples. While-in-use covers are those which are configured such that an electrical cord and cord cap can be plugged into the electrical outlet within the cover while the lid to the cover is closed against the base.

SUMMARY

Particular implementations of electrical device covers comprise a base with an opening large enough to receive an electrical device. The base comprises at least one tab pocket on each of at least two opposing sides of the opening, a lid pivotally coupled to the base and an adapter comprising at least one opening configured to receive at least one electrical device. The adapter comprises at least one engagement tab extending away from the adapter at each of at least two opposing sides of the adapter, wherein the face of the adapter defines a plane for the adapter which abuts the base when coupled to the base. The engagement tabs extend toward the base beyond the front plane, and the adapter slidably couples with the base through sliding the engagement tabs parallel to the front plane into the tab pockets.

Other particular implementations of electrical device covers comprise a base with an opening large enough to receive an electrical device. The base comprises at least one tab pocket on the base, a lid pivotally coupled to the base and an adapter comprising at least one opening configured to receive at least one electrical device. The adapter comprises at least one engagement tab extending away from the adapter, wherein the adapter slidably couples with the base through sliding the at least one engagement tab parallel to a face of the adapter into the at least one tab pocket such that the adapter cannot be removed from the base without first sliding the at least one engagement tab parallel to the adapter face out of the at least one tab pocket.

In more particular implementations of electrical device covers, the base may be formed primarily of metal or plastic, and the adapter may be formed primarily of metal or plastic. In other more particular implementations of electrical device covers, the engagement tabs fit into the tab pockets without deforming the engagement tabs. In still other more particular implementations of electrical device covers, the at least one engagement tab extends substantially parallel with the adapter. The at least one tab pocket may comprise an angled surface. Additionally, or alternatively, the at least one engagement tab may comprise an angled surface. In particular implementations comprising one or more engagement tabs formed primarily of plastic, one or more tab pockets comprise a nub on a front edge of each tab pocket lip, wherein the nub narrows the opening to the at least one tab pocket.

In particular implementations, a method of adapting an electrical outlet base for use with an electrical device comprises providing a base comprising an opening large enough to receive an electrical device, selecting an adapter configured to receive the electrical device, placing the adapter adjacent to the base by the opening through the base, and engaging the adapter with the base. The adapter may be selected from among a plurality of adapters, each adapter configured to receive a differently configured electrical device. The adapter may be engaged with the base by sliding the adapter substantially parallel to the face until at least one engagement tab extending from the adapter enters at least one tab pocket on the base. In particular implementations of the method, placing the adapter adjacent the surface of the base comprises placing the adapter adjacent the surface of the base, off-center of the base. In other particular implementations, the method further comprises moving the adapter substantially perpendicular to the face and toward the base before or after sliding it parallel to the face.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure is described in conjunction with the appended drawings, where like designations denote like elements, and:

FIG. 3A is a rear perspective view of a particular implementation of an electrical outlet cover illustrating a first installation position;

FIG. 6 is a front view of a particular implementation of a second adapter; and

FIG. 7 is a perspective view of a portion of a particular implementation of a third adapter and an angled surface on a tab pocket.

DESCRIPTION

This disclosure, its aspects and implementations, are not limited to the specific components or assembly procedures disclosed herein, as virtually any components consistent with the intended operation of a method and/or system implementation for an electrical outlet cover may be utilized. Many additional components and assembly procedures known in the art consistent with the intended electrical outlet cover and/or assembly procedures for an electrical outlet cover will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such electrical outlet covers and implementing components, consistent with the intended operation.

Implementations of a slide-in adapter relate to an adapter for an electrical device cover. Particular implementations include an adapter comprising at least one opening configured to receive one or more electrical devices. The various implementations may be manufactured using conventional procedures known to those of ordinary skill in the art as added to and improved upon through the procedures described here.

Figure 1:
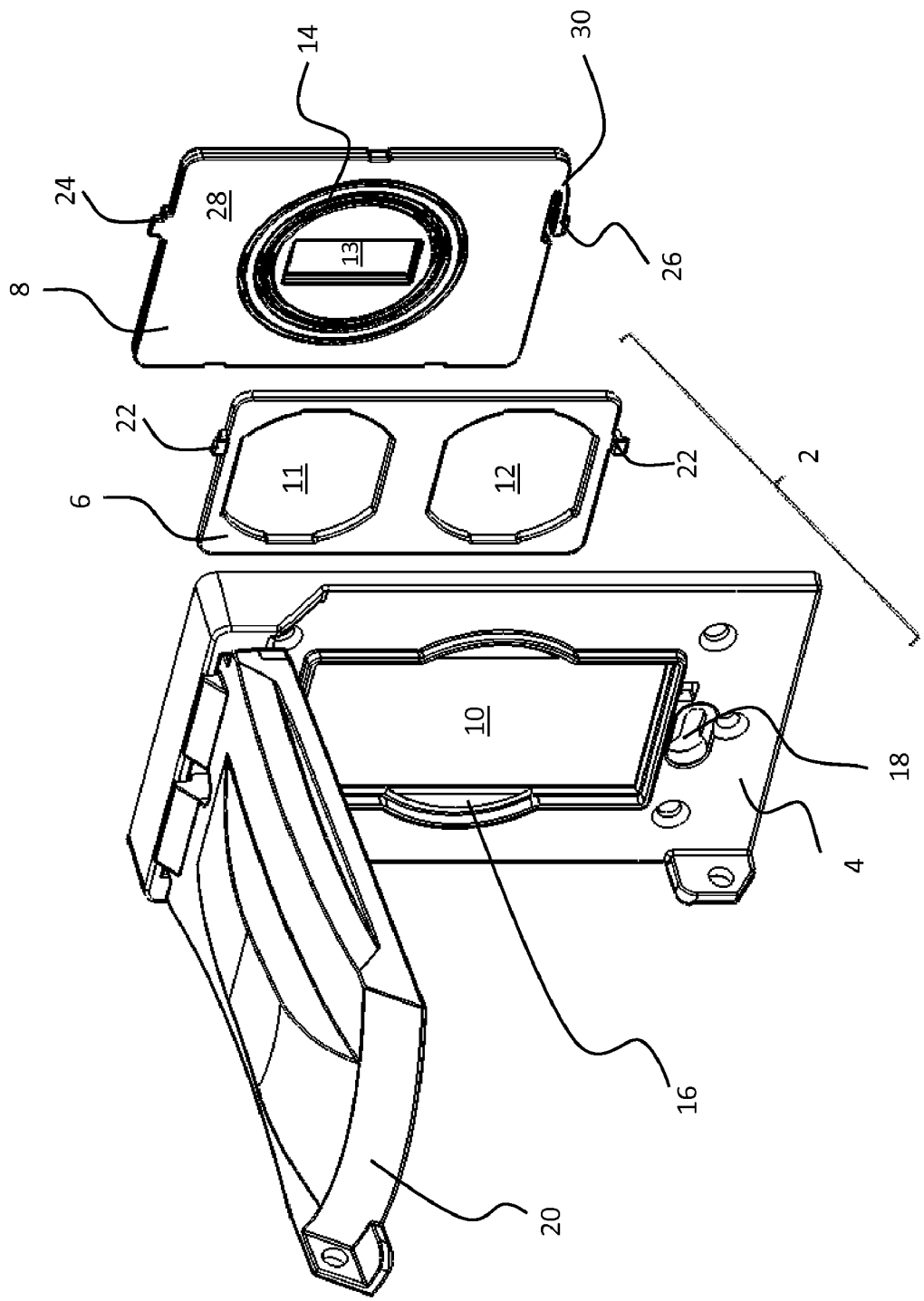
FIG. 1 is a front perspective view of a particular implementation of an electrical outlet cover showing two alternative adapters.

Referring to FIG. 1, a perspective view of a particular implementation of an electrical outlet cover assembly 2 is illustrated. The electrical outlet cover assembly 2 may comprise a base 4 comprising one or more adapters 6, 8. The base 4 comprises an opening therethrough large enough to receive an electrical device. Each of the adapters 6, 8 comprises one or more openings 11, 12, 13 configured to receive one or more electrical devices. In particular implementations of adapters, such as the adapter 8 shown to the right side of FIG. 1 and the adapter 60 shown in FIG. 6, the adapter may comprise one or more removable portions 14, 62 that when removed configure the adapter 8, 60 to receive a different electrical device than that for which it was originally configured. Electrical devices commonly used include, by non-limiting example: a duplex outlet, a toggle switch, a GFCI outlet, and a round outlet. The base 4 of this particular implementation comprises removable portions 16 to assist in adapting the base for use with a large round electrical outlet. U.S. Pat. No. 7,119,227 to Shotey et al., the disclosure of which was previously incorporated by reference, illustrates other examples of adapters and bases with removable sections, which various configurations may be adapted by the principles taught herein for a wider variety of adaptable configurations. The applicability of this disclosure is not limited to any particular adapter configuration.

The base 4 of this particular implementation is pivotably coupled to a lid 20 as is common with weatherproof cover implementations. Although the lid 20 is illustrated as a spring biased flat lid in this particular implementation, unbiased lids and/or while-in-use covers. U.S. Pat. No. 6,476,321 to Shotey et al., the disclosure of which was previously incorporated by reference, discloses numerous examples of both biased flat lids and biased and unbiased while-in-use covers and bases. Any of those examples may be adapted by the principles taught herein for a wider variety of adaptable configurations. The applicability of this disclosure is not limited to any particular type of cover assembly. While the base 4 illustrated is shown as a single piece, in other implementations the base 4 may be formed of any number of pieces coupled together such as, for example, an adapter and base assembled as a base. Particular implementations of an electrical outlet cover assembly 2 may be weatherproof and, therefore, resist entry of water and other contaminants through use of the lid 20 and other structures.

The electrical outlet cover assembly 2 for the particular implementation illustrated in FIG. 1 is shown with the lid 20 in an open position with respect to the base 4. When installed on an electrical device, the face of the electrical device may extend through an electrical device aperture 11, 12, 13 configured to accommodate the electrical device in the adapter 6, 8, and through the opening 10 in the base 4.

In this particular implementation, each of the adapters comprises an engagement tab 22, 24, 26 extending from each of two opposing sides of the adapter 6, 8. Although two engagement tabs 22, 24, 26 are not required for particular implementations, two work well for most implementations. Furthermore, although particular illustrations of engagement tabs shown in the Figures illustrate the engagement tabs as having a generally flat topography, that shape is not required and is only used for illustration convenience. Other shapes are also contemplated for use in particular implementations. For example, the engagement tabs may alternatively be cylindrical, square, oval, triangular or wedge shaped.

The engagement tabs 24, 26 on adapter 8 illustrate two examples of engagement tabs particularly useful for adapters formed primarily of a pliable plastic material, such as polyvinyl chloride (PVC) or other known pliable plastic, or at least where the engagement tabs are made of a plastic. Engagement tab 24 extends from a top side of the adapter and is flush with a first face 28 of the adapter 8. The rear side of the engagement tab 24 is wedge shaped for this particular implementation. The second engagement tab 26 for this implementation includes a biased engagement tab 26 having an engagement tab 26 that is coupled to the adapter 8 through a biased arm 30. The engagement tab 26 includes a wedge shaped front side.

In operation, the adapter 8 may be installed on a base in either of at least three ways. First, adapter 8 may have the first engagement tab 24 inserted into a tab pocket 40 (FIG. 3A) on a surface of the base and then the second engagement tab 26 may be pressed against a second tab pocket 40 on the surface so that the biased arm 30 of the adapter 8 flexes due to the interference of the engagement tab's 26 angled wedge surface with the tab pocket 40 until the second engagement tab 26 snaps into the second tab pocket. For this configuration of engagement tabs, the open sided tab pockets 40 shown in FIG. 3A may be configured with a closed side because there is no need to slide the adapter into the tab pocket. Alternatively, once the first engagement tab 24 is inserted into the first tab pocket, the adapter 8 may be pivoted to slide the second engagement tab 24 into the second tab pocket. Yet still alternatively, the adapter 8 may be inserted using the method described below in relation to FIGS. 3A-3D.

Figure 2B:
FIGS. 2A and 2B are front and side views of a particular implementation of a first adapter.
Figure 2A:
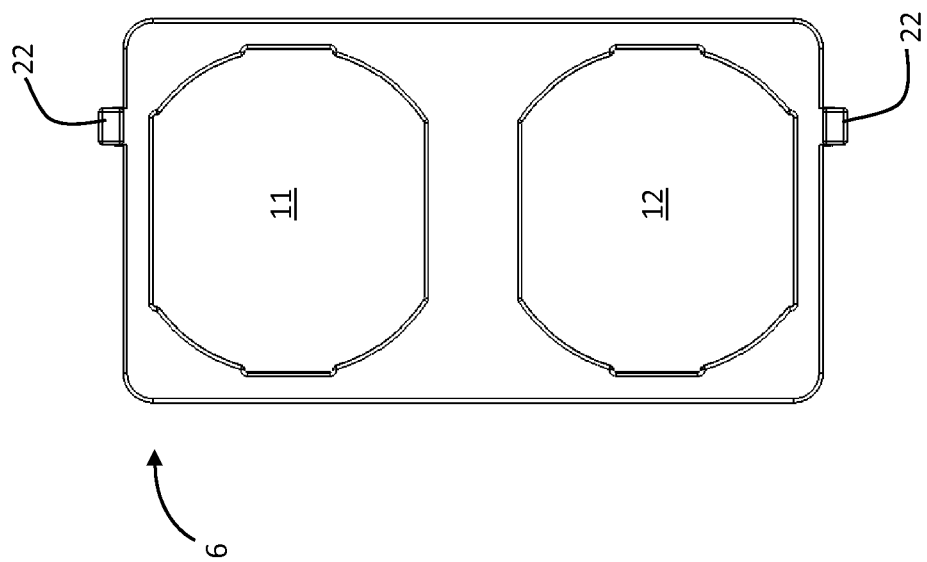

FIGS. 2A and 2B illustrate an adapter 6 example from FIG. 1 having engagement tabs 22 that are particularly useful for adapters made primarily of metal, though this is not a requirement for use of this adapter. Conventionally, forming an easily removable adapter of metal has not been possible. With plastic, conventional adapters with engagement mechanisms have relied on the ability of the plastic to deform and, thus, have a larger engagement mechanism squished into a small space to establish a friction coupling. Metal, however, does not deform as easily as plastic and does not work well in the friction coupling unless one or the other of the components (either the engagement mechanism or the base to which it is coupled) is plastic. In many situations, however, it is desirable for both the base and the adapter to be made of metal which precludes conventional coupling mechanisms. Although this is particularly useful for implementations where both the adapter and base are metal, the particular configurations described herein will also work well where one or the other of the base and engagement tabs, or adapter, are plastic and the other is metal, or where both are plastic.

The engagement tabs 22 extend from opposing top and bottom sides of the adapter 6. FIG. 2B illustrates a plane "P" indicated by dashed line P-P defined by a front 32 of the adapter 6. Note that the engagement tabs 22 extend substantially parallel to the plane P, then extend perpendicularly through the plane P and then again extend parallel to the plane P to their ends. This particular configuration which results in an "L" shaped engagement tab is relevant to engagement with the base as described with reference to FIGS. 3A-3D. Other shapes, such as "J" shaped or "S" shaped engagement tabs that also provide an extending prong along a different plane than the front surface of the adapter would alternatively be suitable. For any of the engagement tab implementations described herein, although the engagement tabs are shown extending from the top and bottom of the adapters, they can just as successfully extend from other opposing sides of the adapter provided the tab pockets on the base are similarly arranged.

FIGS. 3A-3D illustrate in progressive steps how the adapter 6 may be coupled to the base 4 using engagement tabs 22. First, an adapter 6 is selected from one or more adapters that may be included with the cover assembly 2 (FIG. 1). The base 4 comprises tab pockets 40 that align with a finally installed adapter 6 (see FIG. 3D). The tab pockets 40 of this particular implementation comprise an upper surface 42 that extends over an opening 44 in the surface 46 of the base 4. The opening 44 may extend all the way through the base surface 46, or only partially through the surface 46 if the base 4 is thicker than the extent to which the engagement tabs 22 extend beyond the plane P of the adapter 6. For sliding adapter implementations like that illustrated in FIG. 3A, one side 48 of the tab pocket 40 is left open so that the engagement tab can slide laterally into the tab pocket 40 from that side.

Figure 3B:
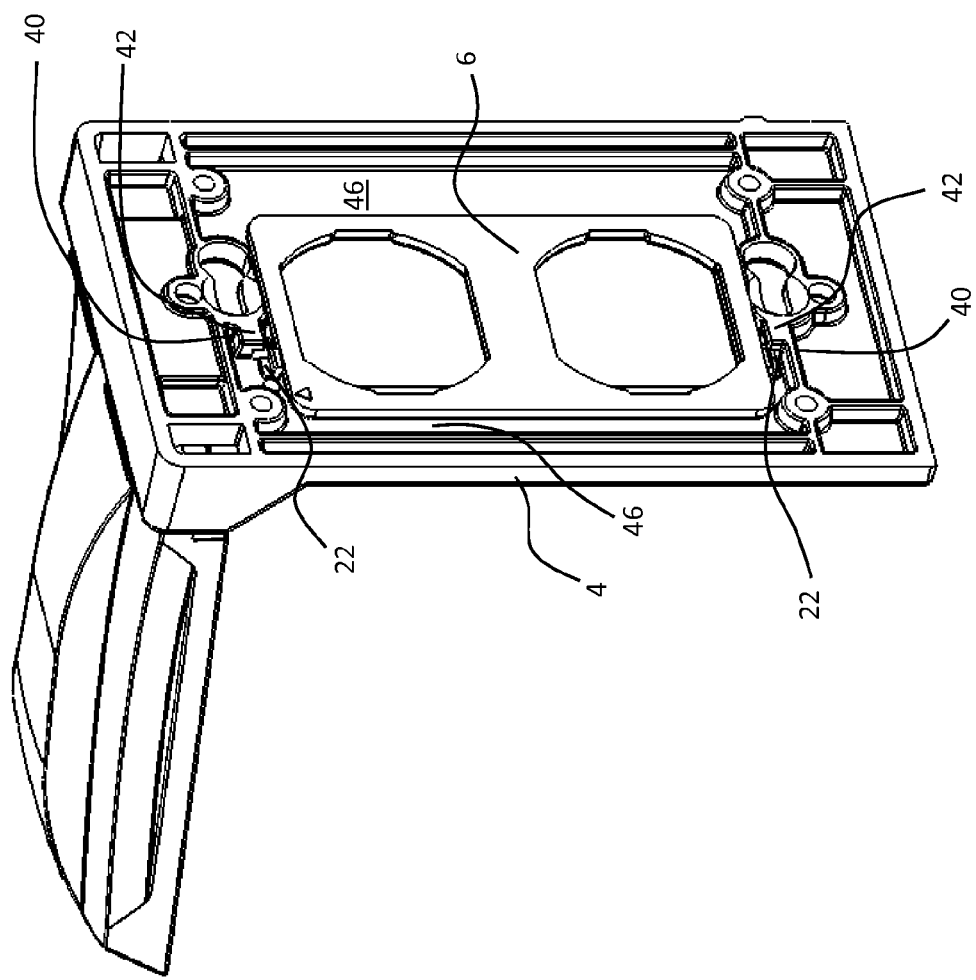
FIG. 3B is a rear perspective view of a particular implementation of an electrical outlet cover illustrating a second installation position.
Figure 3C:
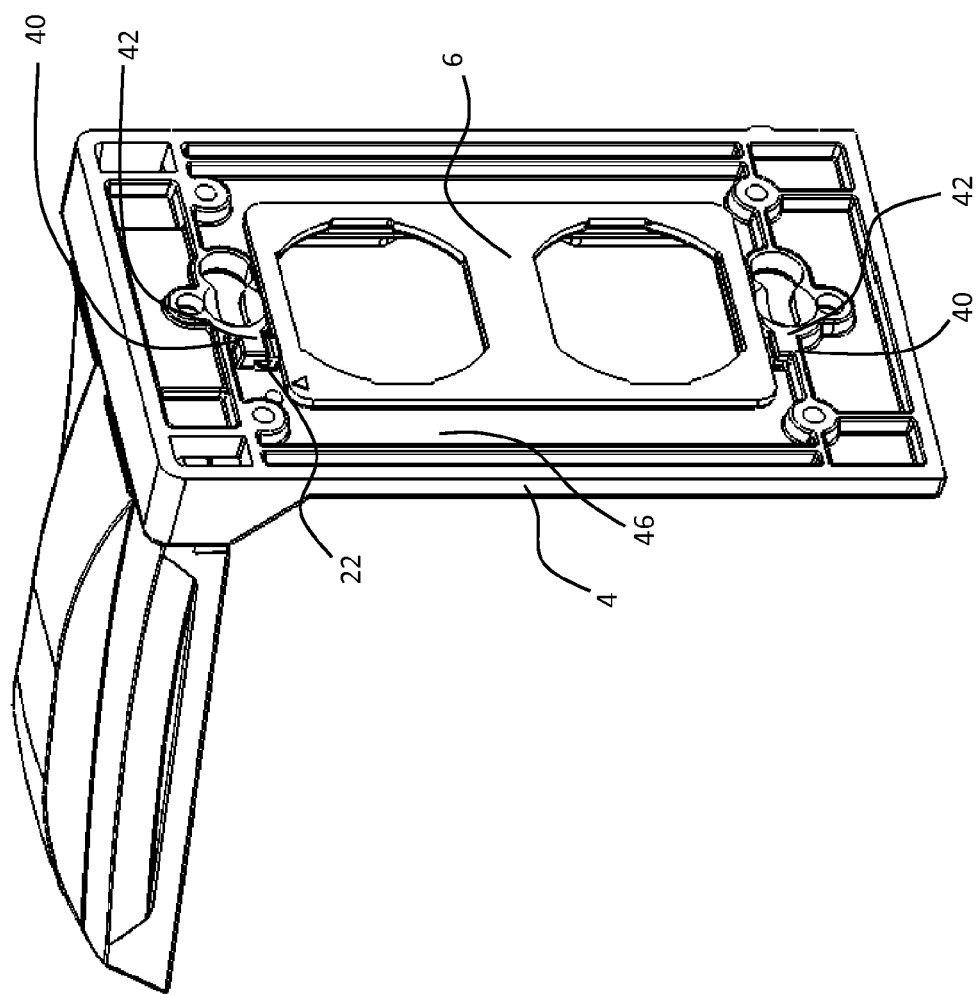
FIG. 3C is a rear perspective view of a particular implementation of an electrical outlet cover illustrating a third installation position.
Figure 3D:
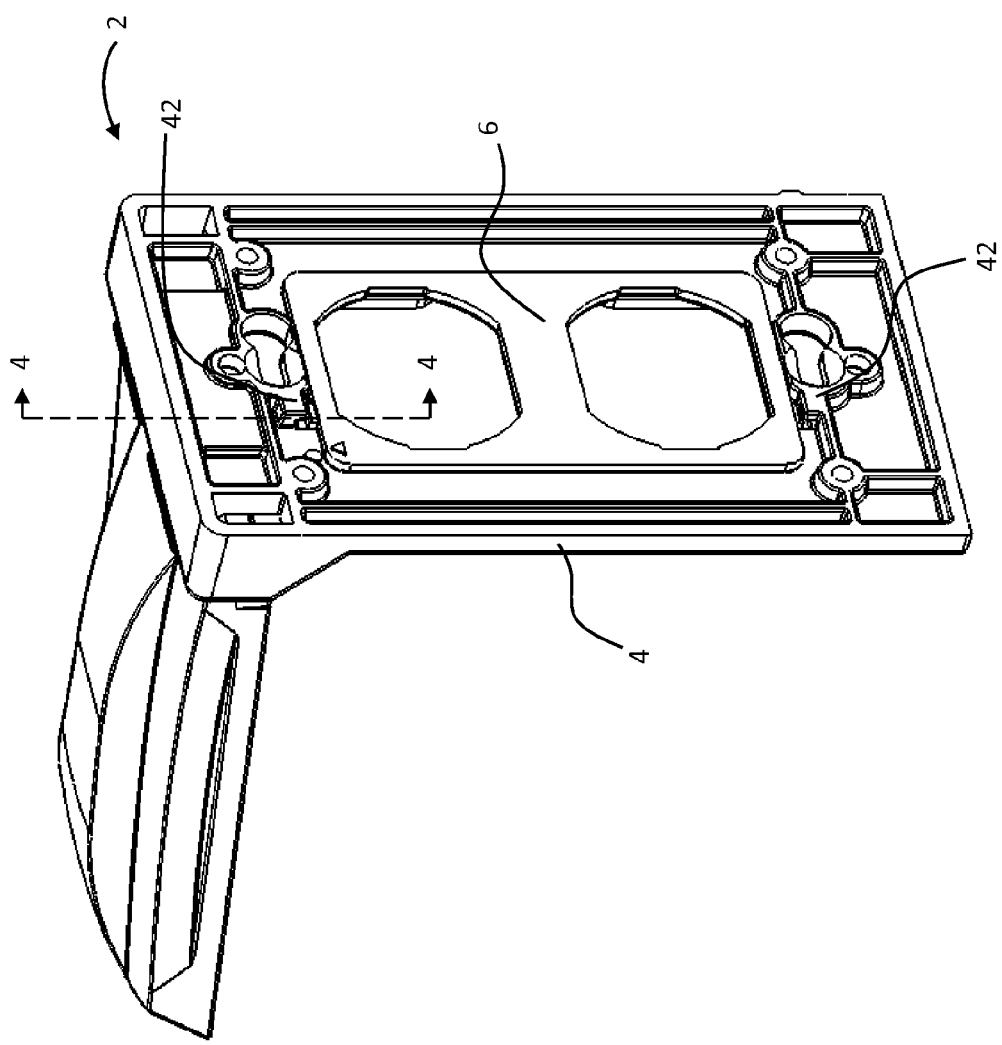
FIG. 3D is a rear perspective view of a particular implementation of an electrical outlet cover illustrating a fourth installation position.
Figure 4:
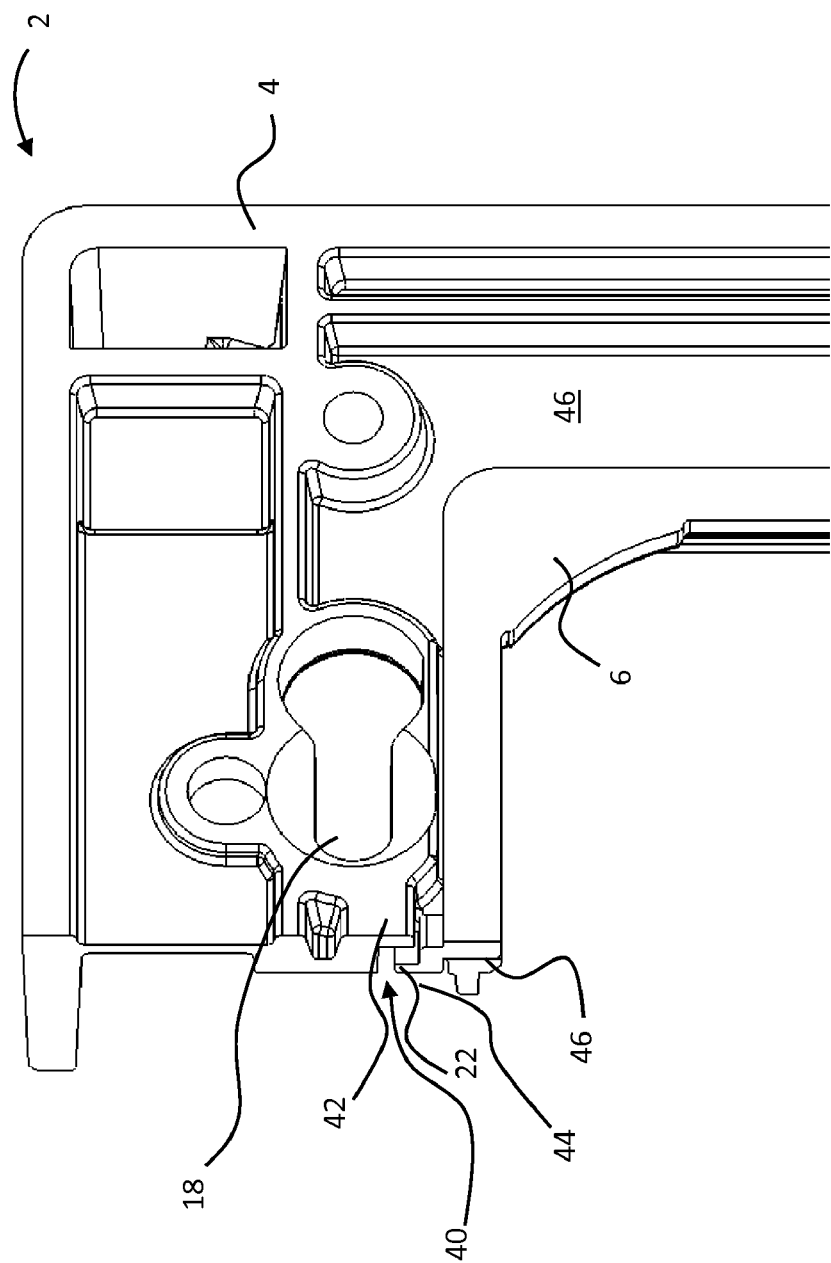
FIG. 4 is a close-up cross-sectional view of the particular implementation shown in FIG. 3D taken along section line 4-4 illustrating the engagement tab and tab pocket.

To install the adapter 6 on the base 4, the engagement tabs 22 are placed against the surface 46 of the base 4 beside the tab pockets 40 so that the adapter 6 is adjacent the surface 46 (see FIG. 3B). In this position, the adapter 6 is off-center of the base because the adapter is to the side of its final installed position. Although the adapter 6 may not yet sit flat on the surface 46 other than possibly its contact with the surface 46 through the engagement tabs 22, the adapter 6 is considered to be adjacent to the surface 46. Once in place, the adapter 6 is moved substantially parallel with the surface 46 in a direction toward the tab pockets 40 so that the engagement tabs 22 move to beneath the upper surface 42 of the tab pocket 40. In this position, the adapter 6 cannot be removed from the base by pulling the adapter 6 directly out; it must be slid substantially parallel to the base surface 46 first to remove it. In other particular implementations where the engagement tabs do not extend beyond the plane P of the surface of the adapter, this position for the adapter may be the final installed position. In some particular implementations, such as the implementation illustrated in FIGS. 3A-3D, with the engagement tabs 22 in position over the opening 44 (FIG. 1) in the base surface 46, the adapter 6 may be moved in a direction generally perpendicular to the adapter plane P so that the adapter 6 now abuts the surface 46 of the base. FIG. 4 illustrates a close-up sectional view of a portion of the cover assembly 2 of FIG. 3D.

Although the adapter 6 is not tightly held to the base 4 with this coupling (note the gap in FIG. 4 between the upper surface 42 of the pocket 40 and the engagement tab 22 fitted into the opening 44 in the base surface 46), this is not cause for concern. When the base 4 is coupled to an electrical device, the box mounting screws for the electrical device are passed through the box mounting screw apertures 18 (see also FIG. 1) of the base 4 so that the base 4, the adapter 6 and the electrical device are together secured to the electrical box. Thus, the adapter 6 is securely coupled to the electrical device through its secured position between the base 4 and the electrical device.

Figure 5B:
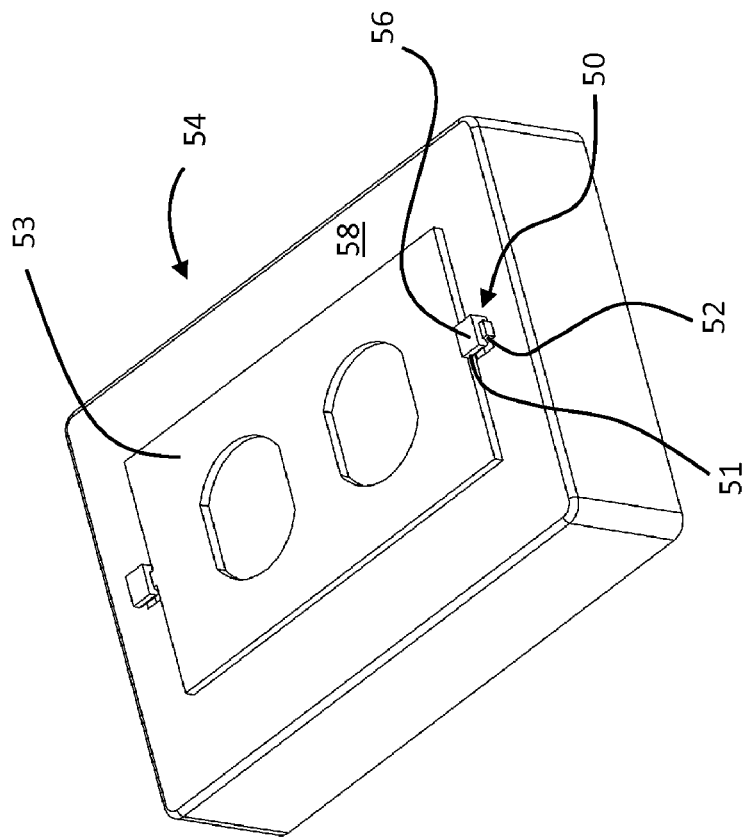
FIGS. 5A and 5B illustrate particular implementations of a base and adapter, the base having a nub at an entrance to a tab pocket, showing uninstalled and installed adapter positions.
Figure 5A:
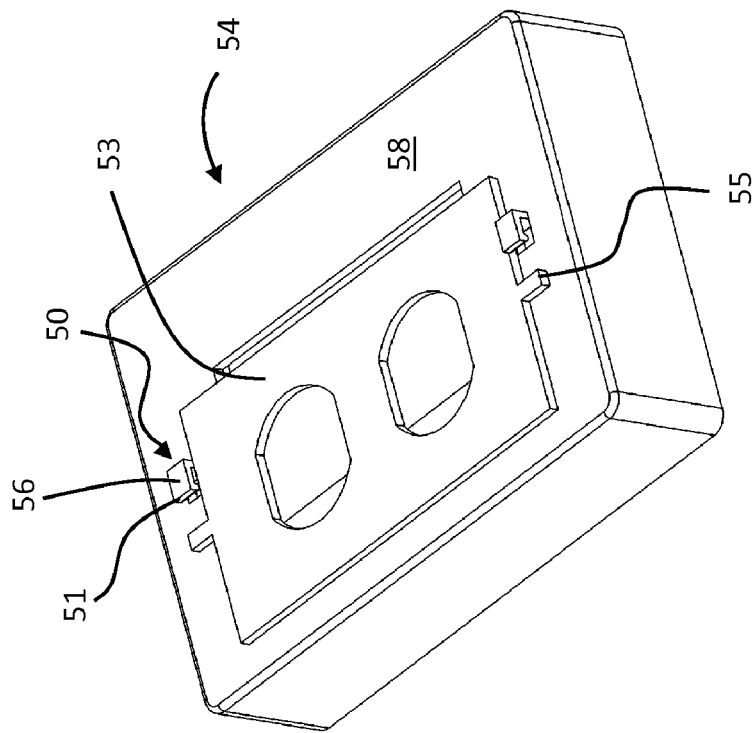

FIGS. 5A and 5B illustrate, respectively, uninstalled and installed positions for an implementation of a base 54 and an adapter 53 with a tab pocket 50 that helps to retain the engagement tab 55. The tab pocket 50 comprises a nub 52 on an edge 51 of the upper surface 56 of the tab pocket 50. The nub 52 extends toward the base surface 58 and has the effect of narrowing the opening to the tab pocket 50 to help to retain the engagement tab 55 within the tab pocket 50 after the engagement tab 55 has been slid laterally into the tab pocket 50. For implementations where one or both of the base 54 and the adapter 53 is made of plastic, this arrangement is particularly useful.

FIG. 7 illustrates a simplified drawing of a portion of an adapter 70 comprising an engagement tab 72, and a tab pocket 74 with an upper surface 76 that comprises an angled surface 78. Although the simplified illustration of FIG. 7 shows both sides of the tab pocket 74 open, in most implementations one or the other side of the tab pocket 74 would include a wall to stop movement of the engagement tab at the end of the tab pocket 74. Use of an angled surface 78 on the upper surface 76 may assist in holding the adapter to the base while the base assembly 2 (FIG. 1) is being mounted on an electrical box. The friction fit caused by the angled surface 78 of the tab pocket 74 does not require deforming of the material that was required by conventional engagement mechanisms and, therefore, can be used with metal and plastic parts, or combinations of metal and plastic parts. The engagement tab 72 illustrated in FIG. 7 is shown as a square engagement tab 72, but may alternatively be made with other shapes as discussed earlier including an angled or wedge shape like engagement tab 24 of FIG. 1 so that the angled surface of the engagement tab and the angled surface 78 would align. In particular implementations, it is contemplated that the angled surface 78 of the tab pocket 74, such as that illustrated in FIG. 7, would be a nub that operates like that described with reference to FIGS. 5A and 5B to help to maintain the engagement tab 72 within the tab pocket 74. Of course, the engagement tab 74 illustrated in FIG. 7 would need the angled surface 78 to be angled the opposite direction so that the nub 80 helped to retain the engagement tab 72 inside the tab pocket 74.

Implementations of an electrical outlet cover and implementing components (lids, bases, adapters, engagement tabs, etc.) may be constructed of a wide variety of materials. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, lead, iron, steel, carbon steel, alloy steel, tool steel, stainless steel, brass, tin, antimony, aluminum, any combination thereof, and/or other like materials; alloys, such as aluminum alloy, titanium alloy, magnesium alloy, copper alloy, any combination thereof, and/or other like materials; any other suitable material; and/or any combination of the foregoing thereof. For the exemplary purposes of this disclosure, the lid and base may be formed of a plastic material like a polyvinyl chloride (PVC), or a metal material like cast metal.

Some components defining any electrical box implementation may be manufactured simultaneously and integrally joined with one another, while other components may be purchased pre-manufactured or manufactured separately and then assembled with the integral components. The various implementations may be manufactured using conventional procedures as added to and improved upon through the procedures described here.

Accordingly, manufacture of these components separately or simultaneously may involve vacuum forming, injection molding, blow molding, casting, forging, cold rolling, milling, drilling, reaming, turning, grinding, stamping, pressing, cutting, bending, welding, soldering, hardening, riveting, punching, plating, and/or the like. Components manufactured separately may then be coupled or removably coupled with the other integral components in any manner, such as with adhesive, a weld joint, a solder joint, a fastener (e.g. a bolt and a nut, a screw, a rivet, a pin, and/or the like), washers, retainers, wrapping, wiring, any combination thereof, and/or the like for example, depending on, among other considerations, the particular material forming the components. For the exemplary purposes of this disclosure, the lid and base may be formed separately by an injection molding process, and then coupled together by a separate assembly step.

In places where the description above refers to particular implementations of an electrical outlet cover, it should be readily apparent that a number of modifications may be made without departing from the spirit thereof and that these implementations may be applied to other electrical outlet covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrical device cover comprising:
a base comprising an opening therethrough large enough to receive an electrical device, the base comprising at least one tab pocket on each of at least two opposing sides of the opening;
a lid pivotally coupled to the base;
an adapter comprising at least one opening therethrough configured to receive at least one electrical device, the adapter further comprising at least one engagement tab extending away from the adapter at each of at least two opposing sides of the adapter;
wherein a first face of the adapter defines a plane for the adapter which abuts the base when coupled to the base;
wherein the engagement tabs extend toward the base beyond the plane; and
wherein the adapter slidably couples with the base through sliding the engagement tabs sliding parallel to the plane into the tab pockets.

2. The electrical device cover of claim 1, wherein the base is formed primarily of metal.

3. The electrical device cover of claim 2, wherein the adapter is formed primarily of metal.

4. The electrical device cover of claim 3, wherein the engagement tabs fit into the tab pockets without deforming the engagement tabs.

5. The electrical device cover of claim 2, wherein the adapter is formed primarily of plastic.

6. The electrical device cover of claim 1, wherein the engagement tabs are formed primarily of plastic and the tab pockets each comprise a nub on a first edge of a tab pocket lip, wherein the nub narrows an opening to the tab pocket.

7. The electrical device cover of claim 1, wherein the at least one engagement tab is formed primarily of plastic and the at least one tab pocket comprises a nub on a front edge of a tab pocket lip, wherein the nub narrows an opening to the at least one tab pocket.

8. A method of adapting an electrical outlet base for use with an electrical device, the method comprising:
providing a base comprising an opening therethrough large enough to receive an electrical device;
selecting an adapter configured to receive the electrical device, the adapter selected from among a plurality of adapters, each adapter configured to receive a differently configured electrical device;
placing the adapter adjacent a surface of the base adjacent the opening through the base; and
engaging the adapter with the base by sliding the adapter substantially parallel to the surface until at least one engagement tab extending from an edge of the adapter enters at least one tab pocket on a back portion of the base.

9. The method of claim 8, wherein placing the adapter adjacent the surface of the base comprises placing the adapter adjacent the surface of the base off-center of the base.

10. The method of claim 8, further comprising moving the adapter substantially perpendicular to the surface of the base and toward the base before or after sliding it parallel to the surface.

11. An electrical device cover comprising:
a base comprising an opening therethrough large enough to receive an electrical device, the base comprising at least one tab pocket on a back portion of the base;
a lid pivotally coupled to the base;
an adapter comprising at least one opening therethrough configured to receive at least one electrical device, the adapter further comprising at least one engagement tab extending away from an edge of the adapter;

wherein the adapter slidably couples with the base through sliding the at least one engagement tab parallel to a face of the adapter into the at least one tab pocket such that the adapter cannot be removed from the base without first sliding the at least one engagement tab parallel to the face out of the at least one tab pocket.

12. The electrical device cover of claim 11, wherein the at least one engagement tab comprises at least two engagement tabs on opposing sides of the adapter and the at least one tab pocket comprises at least two tab pockets on opposing sides of the opening.

13. The electrical device cover of claim 11, wherein the at least one engagement tab extends substantially parallel with the adapter.

14. The electrical device cover of claim 11, wherein the at least one tab pocket comprises an angled surface.

15. The electrical device cover of claim 11, wherein the at least one engagement tab comprises an angled surface.

16. The electrical device cover of claim 11, wherein the face of the adapter defines a plane for the adapter which abuts the base when coupled to the base, and wherein the at least one engagement tab extends toward the base beyond the front plane.

17. The electrical device cover of claim 11, wherein the base is formed primarily of metal.

18. The electrical device cover of claim 17, wherein the adapter is formed primarily of metal.

19. The electrical device cover of claim 18, wherein the at least one engagement tab fits into the at least one tab pocket without deforming the at least one engagement tab.

20. The electrical device cover of claim 17, wherein the adapter is formed primarily of plastic.

* * * * *